US010560210B2

(12) United States Patent
Liu

(10) Patent No.: US 10,560,210 B2
(45) Date of Patent: Feb. 11, 2020

(54) WAVELENGTH CONTROL METHOD AND APPARATUS

(71) Applicant: HUAWEI TECHNOLOGIES CO., LTD., Shenzhen, Guangdong (CN)

(72) Inventor: Wei Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/046,769

(22) Filed: Jul. 26, 2018

(65) Prior Publication Data

US 2018/0359046 A1    Dec. 13, 2018

Related U.S. Application Data

(63) Continuation of application No. PCT/CN2016/074041, filed on Feb. 18, 2016.

(51) Int. Cl.
*H04J 14/02*    (2006.01)
*H04B 10/079*    (2013.01)

(52) U.S. Cl.
CPC .... *H04J 14/0221* (2013.01); *H04B 10/07953* (2013.01); *H04B 2210/078* (2013.01)

(58) Field of Classification Search
CPC .... H04J 14/02; H04J 14/0221; H04J 14/0227; H04B 10/7953; H04B 10/07955; H04B 10/0795

(Continued)

(56) References Cited

U.S. PATENT DOCUMENTS 5,790,289 A * 8/1998 Taga ............... H04J 14/0221
                                                        398/26
7,280,768 B2 * 10/2007 Zaacks ............ H04B 10/07953
                                                       398/159

(Continued)

FOREIGN PATENT DOCUMENTS

CN    102754367 A    10/2012
CN    104243019 A    12/2014

(Continued)

OTHER PUBLICATIONS

International Search Report issued in International Application No. PCT/CN2016/074041 dated Nov. 8, 2016, 13 pages.

(Continued)

*Primary Examiner* — Hanh Phan
(74) *Attorney, Agent, or Firm* — Fish & Richardson P.C.

(57) ABSTRACT

A wavelength control system, method, and apparatus are described in the present disclosure. An example method include: adjusting powers of subcarriers on a super channel to a same power, where the subcarriers of the super channel includes consecutive subcarriers, a subcarrier i−1, a subcarrier i, and a subcarrier i+1; obtaining Q values of the subcarrier i−1 and the subcarrier i+1, where the Q values indicate performance of the subcarriers; calculating a Q value difference between the Q value of the subcarrier i+1 and the Q value of the subcarrier i−1, and calculating a difference between the Q value difference and a pre-obtained reference value of the subcarrier i; determining whether the absolute value of the difference is not less than the pre-obtained allowable frequency offset value, and adjusting a center wavelength of the subcarrier i according to the difference.

15 Claims, 11 Drawing Sheets

(58) Field of Classification Search
USPC ......... 398/79, 193, 194, 195, 196, 197, 198, 398/199, 33, 34, 38, 25, 26, 27, 158, 159, 398/162, 160, 91, 94, 95, 93
See application file for complete search history.

(56) References Cited

U.S. PATENT DOCUMENTS

| | | |
|---|---|---|
| 2012/0263461 A1 | 10/2012 | Lowery et al. |
| 2013/0251365 A1 | 9/2013 | Sone et al. |
| 2014/0314415 A1 | 10/2014 | Vassilieva et al. |
| 2015/0086200 A1 | 3/2015 | Xie et al. |

FOREIGN PATENT DOCUMENTS

| | | | |
|---|---|---|---|
| CN | 104980213 | A | 10/2015 |
| EP | 2792248 | A1 | 10/2014 |
| EP | 2933809 | A1 | 10/2015 |
| WO | 2015022034 | A1 | 2/2015 |
| WO | 2015190328 | A1 | 12/2015 |

OTHER PUBLICATIONS

Wang Huiyi et al, Discussions on optical amplification and dispersion management in 40 Gbit/s fiber-optic communication systems. Study on Optical Communications, Feb. 2014, Sum. No. 181, 3 pages, 2014.
Chinese Office Action issued in Chinese Application No. 201680041617.5 dated Mar. 15, 2019, 5 pages.
Extended European Search Report issued in European Application No. 16890186.6 dated Jan. 2, 2019, 6 pages.

\* cited by examiner

| Sequence number/Q value of a subcarrier | Frequency offset (GHz) of a center wavelength of a subcarrier 15 | | | | | | |
|---|---|---|---|---|---|---|---|
| | −1.5 | −1 | −0.5 | 0 | 0.50 | 1 | 1.5 |
| 10 | 6.349278 | 6.403821 | 6.460367 | 6.507794 | 6.566644 | 6.596068 | 6.626563 |
| 15 | 7.134188 | 7.047212 | 7.121396 | 7.19815 | 7.172565 | 7.159773 | 7.047212 |
| 12 | 7.424284 | 7.384918 | 7.351014 | 7.292091 | 7.251791 | 7.159773 | 7.071609 |
| Q12−Q10 | 1.075007 | 0.981097 | 0.890647 | 0.784297 | 0.685147 | 0.563705 | 0.445047 |
| Q10+Q15+Q12 | 20.90775 | 20.83595 | 20.93278 | 20.99803 | 20.991 | 20.91561 | 20.74538 |

Optimum center wavelength

FIG. 8

WAVELENGTH CONTROL METHOD AND APPARATUS

CROSS-REFERENCE TO RELATED APPLICATIONS

This application is a continuation of International Application No. PCT/CN2016/074041, filed on Feb. 18, 2016, which is hereby incorporated by reference in its entirety.

TECHNICAL FIELD

The present application relates to the communications field, and in particular, to a wavelength control method and apparatus.

BACKGROUND

An existing wavelength division multiplexing (WDM) system usually uses a channel spacing of 50 GHz or 100 GHz, and all WDM paths usually use a same signal format and a same rate. That is, the existing wavelength division multiplexing system is a fixed-grid WDM system. As technologies such as super-speed, especially over 100 Gb/s, WDM transmission, networking, and a software defined network (SDN) develop, the conventional WDM system encounters challenges in terms of spectrum utilization, flexibility, scalability, and the like, and there is a need for application of a flexible-grid WDM system that supports different channel spacings and different transmission rates and that can dynamically set a channel spacing according to a requirement.

However, when a width of a flexible grid approximates a spectral width of a signal, filtering costs are extremely high. Currently, a method for resolving the problem is a super channel technology. In the super channel technology, transmission is performed on a same channel by using a plurality of adjacent subcarriers, and a guard band is added to an edge wavelength, to reduce the filtering costs. The channel is referred to as a super channel. However, due to a decrease in a wavelength spacing, a slight center wavelength offset causes relatively high system performance costs, and affects a link length. A center wavelength is a wavelength corresponding to a location with maximum power energy in a subcarrier.

It can be learned that how to precisely control a center wavelength of a subcarrier is an urgent technical problem that currently needs to be resolved.

SUMMARY

Embodiments of the present invention provide a wavelength control method and apparatus, so as to precisely control a center wavelength of a subcarrier.

According to a first aspect, an embodiment of the present invention provides a wavelength control method, including:

adjusting powers of all subcarriers on a super channel to a same power, where the super channel includes at least a subcarrier $i-1$, a subcarrier $i$, and a subcarrier $i+1$, the subcarrier $i-1$, the subcarrier $i$, and the subcarrier $i+1$ are consecutive subcarriers, and i is a positive integer greater than 1;

when the powers of all the subcarriers on the super channel are adjusted to the same power, obtaining Q values of the subcarrier $i-1$ and the subcarrier $i+1$, where the Q values are used to indicate performance of the subcarriers;

calculating a Q value difference between the Q value of the subcarrier $i+1$ and the Q value of the subcarrier $i-1$, and calculating a difference between the Q value difference and a pre-obtained reference value of the subcarrier $i$; and determining whether an absolute value of the difference is less than a pre-obtained allowable frequency offset value, and if the absolute value of the difference is not less than the pre-obtained allowable frequency offset value, adjusting a center wavelength of the subcarrier $i$ according to the difference.

In the implementation, the center wavelength of the subcarrier $i$ may be adjusted according to the difference between the reference value and the difference between the Q values of the subcarrier $i+1$ and the subcarrier $i-1$. It is found in practice that a difference between Q values of two adjacent subcarriers of an intermediate subcarrier is in a linear relationship with a frequency offset of the intermediate subcarrier. Therefore, precise control can be implemented on the center wavelength of the subcarrier $i$ can be precisely controlled.

In a first possible implementation of the first aspect, the adjusting a center wavelength of the subcarrier $i$ according to the difference may include:

when the difference indicates that the Q value difference is less than the reference value, adjusting the center wavelength of the subcarrier $i$ to a direction in which a frequency of the subcarrier is high, where whether a current difference is less than the allowable frequency offset value is calculated during adjustment, and the adjustment is ended when the current difference is less than the allowable frequency offset value; or when the difference indicates that the Q value difference is greater than the reference value, adjusting the center wavelength of the subcarrier $i$ to a direction in which a frequency of the subcarrier is low, where whether a current difference is less than the allowable frequency offset value is calculated during adjustment, and the adjustment is ended when the current difference is less than the allowable frequency offset value, where the current difference is a difference between a current Q value difference and the reference value, the current Q value difference is a Q value difference between a current Q value of the subcarrier $i+1$ and a current Q value of the subcarrier $i-1$, and the current Q value of the subcarrier $i+1$ and the current Q value of the subcarrier $i-1$ are respectively current Q values, obtained during the adjustment, of the subcarrier $i+1$ and the subcarrier $i-1$.

In the implementation, when the center wavelength is adjusted, whether the current difference is less than the allowable frequency offset value is calculated, and the adjustment is ended when the current difference is less than the allowable frequency offset value, so that adjustment precision of the center wavelength can be improved.

With reference to the first aspect or the first possible implementation of the first aspect, the adjusting powers of all subcarriers on a super channel to a same power may include:

adjusting the powers of all the subcarriers on the super channel to a target power, where the target power belongs to a power-insensitive range, and the power-insensitive range means that when a power of a subcarrier changes in the range, a change magnitude of a Q value of the subcarrier is less than a preset threshold.

In the implementation, a power of each subcarrier is adjusted to the power-insensitive range. When the power of the subcarrier changes in the power-insensitive range, a change magnitude of a Q value of the subcarrier is less than the preset threshold. Therefore, the Q value of the subcarrier changes extremely slightly during calculation, so that detection precision of an offset of a center wavelength can be improved.

With reference to the first aspect, the first possible implementation of the first aspect, or the second possible implementation of the first aspect, in a third possible implementation of the first aspect, before the adjusting powers of all subcarriers on a super channel to a same power, the method further includes:

adjusting the powers of all the subcarriers on the super channel to the power-insensitive range, where the power-insensitive range means that when a power of a subcarrier changes in the range, a change magnitude of a Q value of the subcarrier is less than the preset threshold;

obtaining N Q value sums when the powers, at a transmit end and a receive end, of all the subcarriers on the super channel are adjusted to the power-insensitive range, where the N Q value sums are sums, calculated when the center wavelength of the subcarrier i is at N different frequencies, of Q values of the subcarrier i−1, the subcarrier i, and the subcarrier i+1, and N is an integer greater than 1;

selecting a maximum Q value sum from the N Q value sums, and using, as the reference value, a Q value difference between a Q value of the subcarrier i+1 and a Q value of the subcarrier i−1, where the Q value of the subcarrier i+1 and the Q value of the subcarrier i−1 are used when the maximum Q value sum is calculated; and after the reference value is calculated, adjusting the powers of all the subcarriers on the super channel to powers that have not been adjusted to the power-insensitive range.

In the implementation, the Q value difference between the Q value of the subcarrier i+1 and the Q value of the subcarrier i−1 that correspond to the maximum Q value sum may be selected as the reference value. A larger Q value indicates better performance of a subcarrier. Therefore, in the implementation, the calculated reference value is optimum, so that precision of adjusting the center wavelength of the subcarrier based on the reference value is also extremely high.

With reference to the first aspect, the first possible implementation of the first aspect, the second possible implementation of the first aspect, or the third possible implementation of the first aspect, in a fourth possible implementation of the first aspect, the method may further include:

when a Q value of the subcarrier i is less than a preset threshold, determining whether a power of the subcarrier i is less than a power of an adjacent subcarrier; and if the power of the subcarrier i is less than the power of the adjacent subcarrier, adjusting the powers of all the subcarriers on the super channel to a preset initial power, where the adjacent subcarrier includes at least one of the subcarrier i−1 or the subcarrier i+1; and if the power of the subcarrier i is not less than the power of the adjacent subcarrier, performing the step of adjusting powers of all subcarriers on a super channel to a same power.

In the implementation, a power of each subcarrier may be adjusted when a Q value of the subcarrier decreases, to improve performance of the subcarrier. Alternatively, a center wavelength of the subcarrier may be adjusted, to improve performance of the subcarrier.

According to a second aspect, an embodiment of the present invention provides a wavelength control apparatus. The apparatus is configured to implement functions of the method provided in the first aspect and is implemented by hardware/software. The hardware/software includes units corresponding to the foregoing functions.

According to a third aspect, an embodiment of the present invention provides a wavelength control apparatus, including: a processor, a network interface, a memory, and a communications bus, where the communications bus is configured to implement connection and communication between the processor, the network interface, and the memory, and the processor executes a program stored in the memory to implement the steps in the method provided in the first aspect.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 8 is a schematic diagram of data according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
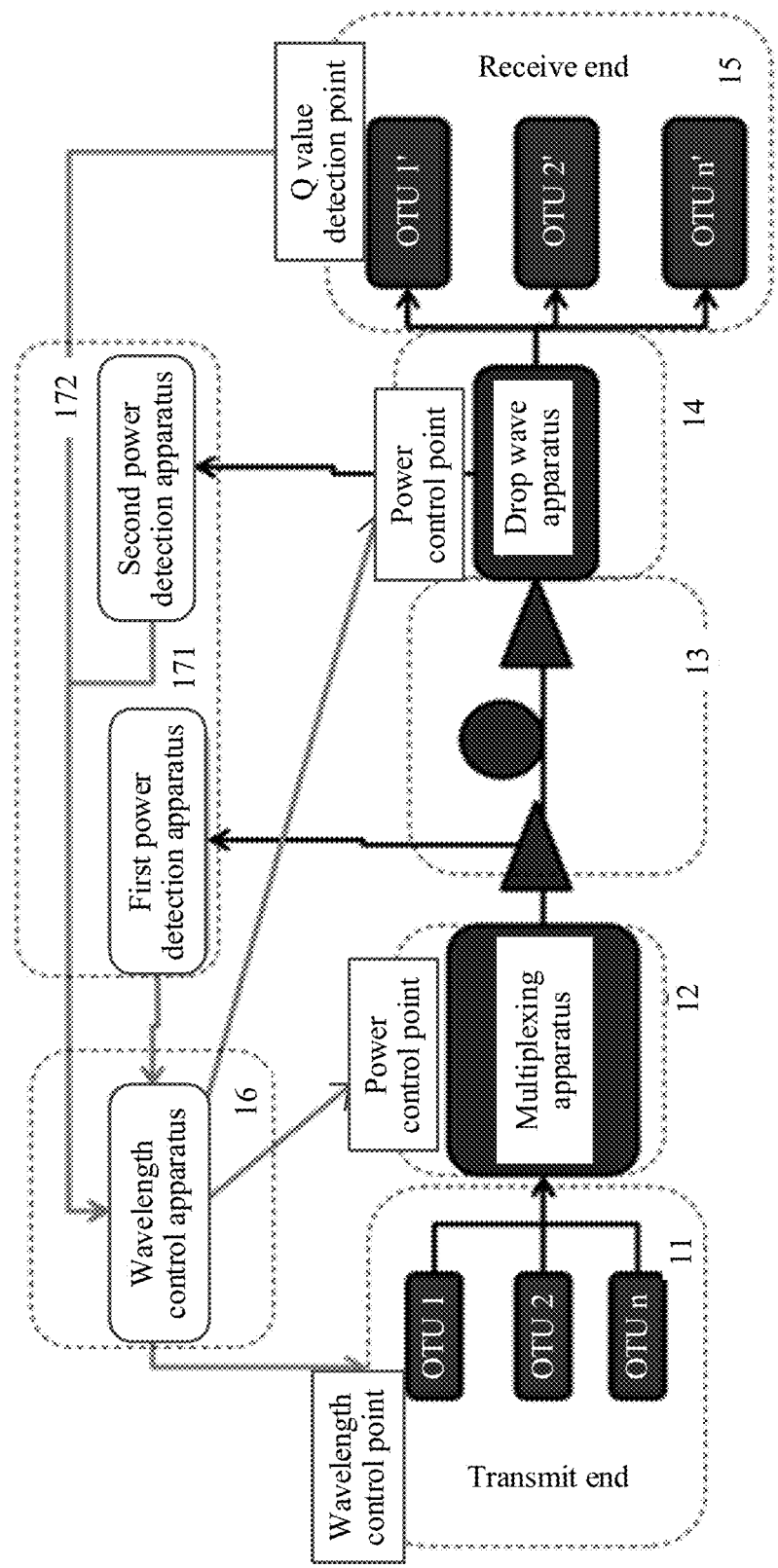
FIG. 1 is a diagram of a system architecture to which a wavelength control method can be applied according to an embodiment of the present invention.

Referring to FIG. 1, FIG. 1 is a diagram of a system architecture to which a wavelength control method can be applied according to an embodiment of the present invention. As shown in FIG. 1, the system architecture includes a transmit end 11, a multiplexing apparatus 12, a transmission link 13, a drop wave apparatus 14, a receive end 15, a wavelength control apparatus 16, a first power detection apparatus 171, and a second power detection apparatus 172. The transmit end 11 includes a plurality of optical transponder units (OTU) corresponding to subcarriers, and the subcarriers are in a one-to-one correspondence with the OTUs. The multiplexing apparatus 12 may be further understood as a wavelength selective switch (WSS) or a coupler. Moreover, an attenuator may be built in the multiplexing apparatus 12, and may adjust a power at a transmit end of each subcarrier. The drop wave apparatus 14 may be further understood as an equalizer. An attenuator may be built in the drop wave apparatus 14, and may adjust a power at a receive end of each subcarrier. The transmit end 11 includes a plurality of OTUs corresponding to the subcarriers. The first power detection apparatus 171 may detect the power at the transmit end of each subcarrier, and transmits the power to the wavelength control apparatus 16. The second power detection apparatus 172 may detect the power at the receive end of each subcarrier, and transmits the power to the wavelength control apparatus 16. In addition, the wavelength control apparatus 16 may further separately communicate with the transmit end 11, the multiplexing apparatus 12, the drop wave apparatus 14, and the receive end 15. The wavelength control apparatus 16 transmits a power adjustment command to each of the multiplexing apparatus 12 and the drop wave apparatus 14, to adjust power at a transmit end of the subcarrier and power at a receive end of the subcarrier. Specifically, the power at the transmit end of the subcarrier and the power at the receive end of the subcarrier may be controlled by using power control points of the multiplexing apparatus 12 and the drop wave apparatus 14. The wavelength control apparatus 16 may further send a wavelength adjustment command to the transmit end 11, to adjust a wavelength of a subcarrier. Specifically, the wavelength of the subcarrier may be adjusted by using a wavelength control point at the transmit end 11. The wavelength control apparatus 16 may further obtain a Q value, detected by the receive end 15, of a subcarrier. Specifically, the Q value, detected by the receive end 15, of the subcarrier may be obtained by using a Q value detection point at the receive end 15.

In addition, the foregoing apparatuses may communicate with each other through a software interface or a hardware interface. In addition, the wavelength control apparatus 16, the first power detection apparatus 171, and the second power detection apparatus 172 in the foregoing system architecture may be deployed in a same device, for example, are all deployed in the multiplexing apparatus 12, or are all deployed in an optical power detection unit (optical power monitor, OPM). Certainly, the wavelength control apparatus 16, the first power detection apparatus 171, and the second power detection apparatus 172 may be alternatively deployed in different settings respectively. In addition, the wavelength control apparatus 16 may be alternatively deployed at the transmit end 11.

Figure 2:
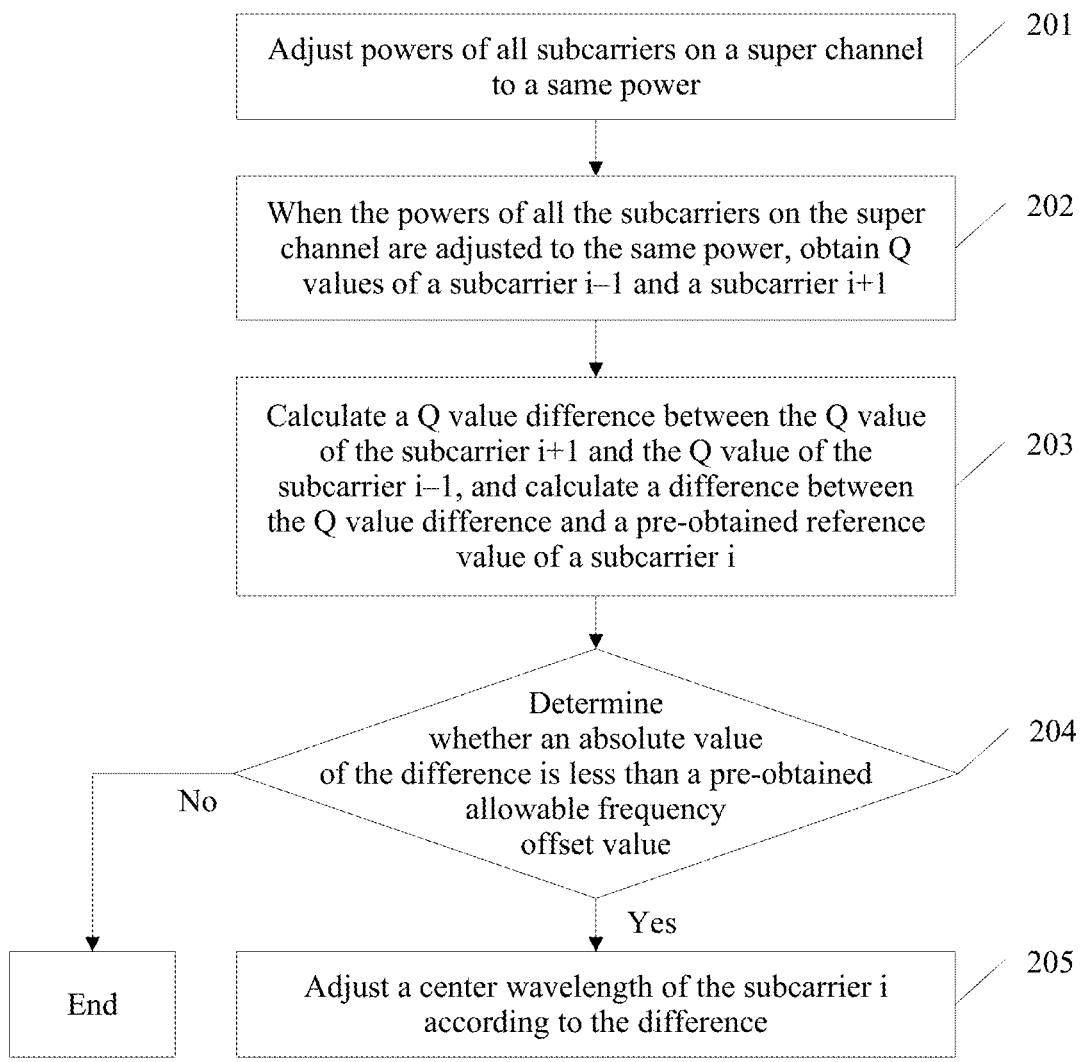
FIG. 2 is a schematic flowchart of a wavelength control method according to an embodiment of the present invention.

Referring to FIG. 2, FIG. 2 is a schematic flowchart of a wavelength control method according to an embodiment of the present invention. As shown in FIG. 2, the wavelength control method includes the following steps.

201. Adjust powers of all subcarriers on a super channel to a same power, where the super channel includes at least a subcarrier i−1, a subcarrier i, and a subcarrier i+1, the subcarrier i−1, the subcarrier i, and the subcarrier i+1 are consecutive subcarriers, and i is a positive integer greater than 1.

In this embodiment, the adjusting powers of all subcarriers on a super channel to a same power may be adjusting all the powers, at a transmit end and a receive end, of all the subcarriers on the super channel to the same power. For example, the step may be as follows: A wavelength control apparatus sends a power adjustment command to each of a multiplexing apparatus and a drop wave apparatus. The power adjustment command is used to instruct the multiplexing apparatus and the drop wave apparatus to adjust the powers of the subcarriers to the same power. Certainly, in some embodiments, the wavelength control apparatus may directly adjust the powers of all the subcarriers on the super channel to the same power. For example, the wavelength control apparatus is deployed in the multiplexing apparatus.

In addition, in this embodiment, the subcarrier i−1, the subcarrier i, and the subcarrier i+1 may be further understood as an $(i-1)^{th}$ subcarrier, an $i^{th}$ subcarrier, and an $(i+1)^{th}$ subcarrier, and i−1, i, and i+1 herein may be understood as identifiers or sequence numbers of the subcarriers. In addition, that the subcarrier i−1, the subcarrier i, and the subcarrier i+1 are consecutive subcarriers may be understood as that the subcarrier i−1, the subcarrier i, and the subcarrier i+1 are subcarriers that are sequentially transmitted on the super channel. The subcarrier i−1 and the subcarrier i+1 are used as adjacent subcarriers of the subcarrier i.

202. When the powers of all the subcarriers on the super channel are adjusted to the same power, obtain Q values of the subcarrier i−1 and the subcarrier i+1, where the Q values are used to indicate performance of the subcarriers.

The step may be as follows: When a receive end detects the Q values of the subcarrier i−1 and the subcarrier i+1, the wavelength control apparatus receives the Q values, transmitted by the receive end, of the subcarrier i−1 and the subcarrier i+1. Alternatively, the step may be as follows: The wavelength control apparatus directly receives the Q values, detected at the receive end, of the subcarrier i−1 and the subcarrier i+1.

In addition, in this embodiment, a Q value of a subcarrier is used to indicate performance of the subcarrier, and the Q value of the subcarrier is in direct proportion to the performance of the subcarrier.

203. Calculate a Q value difference between the Q value of the subcarrier i+1 and the Q value of the subcarrier i−1, and calculate a difference between the Q value difference and a pre-obtained reference value of the subcarrier i.

The step may be as follows: The wavelength control apparatus calculates the Q value difference between the Q value of the subcarrier i+1 and the Q value of the subcarrier i−1, and calculates the difference between the Q value difference and the pre-obtained reference value of the subcarrier i.

204. Determine whether an absolute value of the difference is less than a pre-obtained allowable frequency offset value; and perform step 205 if the absolute value of the difference is not less than the pre-obtained allowable frequency offset value; or if the absolute value of the difference is less than the pre-obtained allowable frequency offset value, end the procedure, or adjust the powers of the subcarriers back to powers that have not been adjusted.

205. Adjust a center wavelength of the subcarrier i according to the difference.

The center wavelength may be understood as a wavelength corresponding to a location with maximum power energy in the subcarrier i.

In step 205, the wavelength control apparatus may send a wavelength adjustment command to a transmit end, and the transmit end responds to the wavelength adjustment command, to adjust the center wavelength of the subcarrier i according to the difference. Certainly, in some embodiments, the wavelength control apparatus may directly adjust the center wavelength of the subcarrier i according to the difference. For example, the wavelength control apparatus is deployed at the transmit end.

Figure 3:
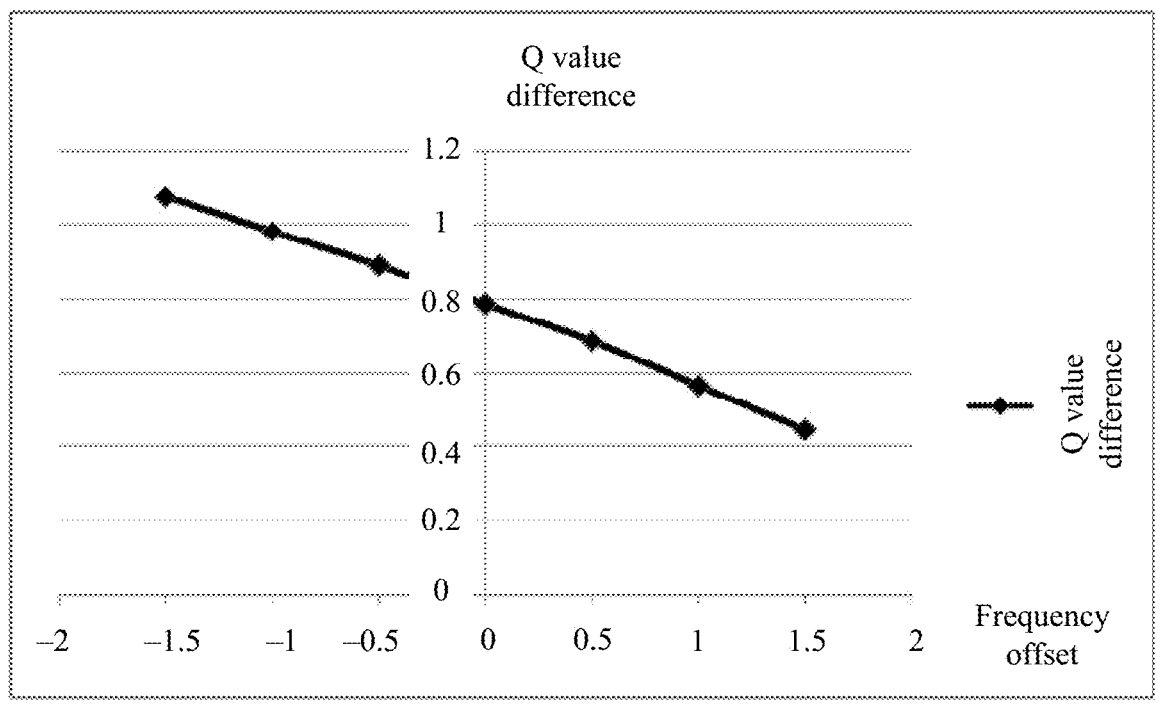
FIG. 3 is a schematic diagram of a relationship between a frequency offset and a Q value of a subcarrier according to an embodiment of the present invention.

In this embodiment, the difference between the reference value and the Q value difference between the Q value of the subcarrier i+1 and the Q value of the subcarrier i−1 is used to indicate a frequency offset of the subcarrier i. This is because it is proved by a large quantity of experiments that when powers of consecutive subcarriers are the same, a frequency offset of an intermediate subcarrier brings better performance of one of two adjacent subcarriers of the intermediate subcarrier, and causes worse performance of the other subcarrier. That is, a Q value difference of the two adjacent subcarriers is in a linear relationship with the frequency offset of the intermediate subcarrier. That is, the Q value difference between the Q value of the subcarrier i+1 and the Q value of the subcarrier i−1 is in a linear relationship with the frequency offset of the subcarrier i. As shown in FIG. 3, a larger frequency offset of the subcarrier i causes a larger Q value difference between the Q value of the subcarrier i+1 and the Q value of the subcarrier i−1.

According to the foregoing relationship, in this embodiment, a change in a Q value of an adjacent subcarrier of a subcarrier may be detected, the change is compared with a standard value to determine an offset of a wavelength of the subcarrier, and the offset is fed back to adjust a center wavelength. For example, the standard value is 0.5 GHz. In this case, in this embodiment, a super channel system whose control precision is a ±0.5 GHz frequency offset of a center wavelength of a subcarrier may be constructed. In addition, in this embodiment, a frequency offset range of the subcarrier on the super channel may be precisely controlled within ±0.5 GHz, and in an implementation process, it is only required to adjust a power of the subcarrier and obtain a Q value of the subcarrier. To implement the two aspects, only a subcarrier power detection apparatus needs to be added. For example, the two aspects can be implemented by adding an OPM. Therefore, frequency offset costs of the system are greatly reduced. Moreover, it is found in practice that when the frequency offset range falls within ±0.5 GHz, transmission performance may be correspondingly improved by 80 km to 160 km. This is of great significance.

In this embodiment, the powers of all the subcarriers on the super channel are adjusted to the same power, and the super channel includes at least the subcarrier i−1, the subcarrier i, and the subcarrier i+1. When the powers of all the subcarriers on the super channel are adjusted to the same power, the Q values of the subcarrier i−1 and the subcarrier i+1 are obtained, and the Q values are used to indicate the performance of the subcarriers. The Q value difference between the Q value of the subcarrier i+1 and the Q value of the subcarrier i−1 is calculated, and the difference between the Q value difference and the pre-obtained reference value of the subcarrier i is calculated. Whether the absolute value of the difference is less than the pre-obtained allowable frequency offset value is determined, and if the absolute value of the difference is not less than the pre-obtained allowable frequency offset value, the center wavelength of the subcarrier i is adjusted according to the difference. The center wavelength of the subcarrier i may be adjusted according to the difference between the reference value and the difference between the Q values of the subcarrier i+1 and the subcarrier i−1. It is found in practice that a difference between Q values of two adjacent subcarriers of an intermediate subcarrier is in a linear relationship with a frequency offset of the intermediate subcarrier. Therefore, precise control can be the center wavelength of the subcarrier i can be precisely controlled.

Figure 4:
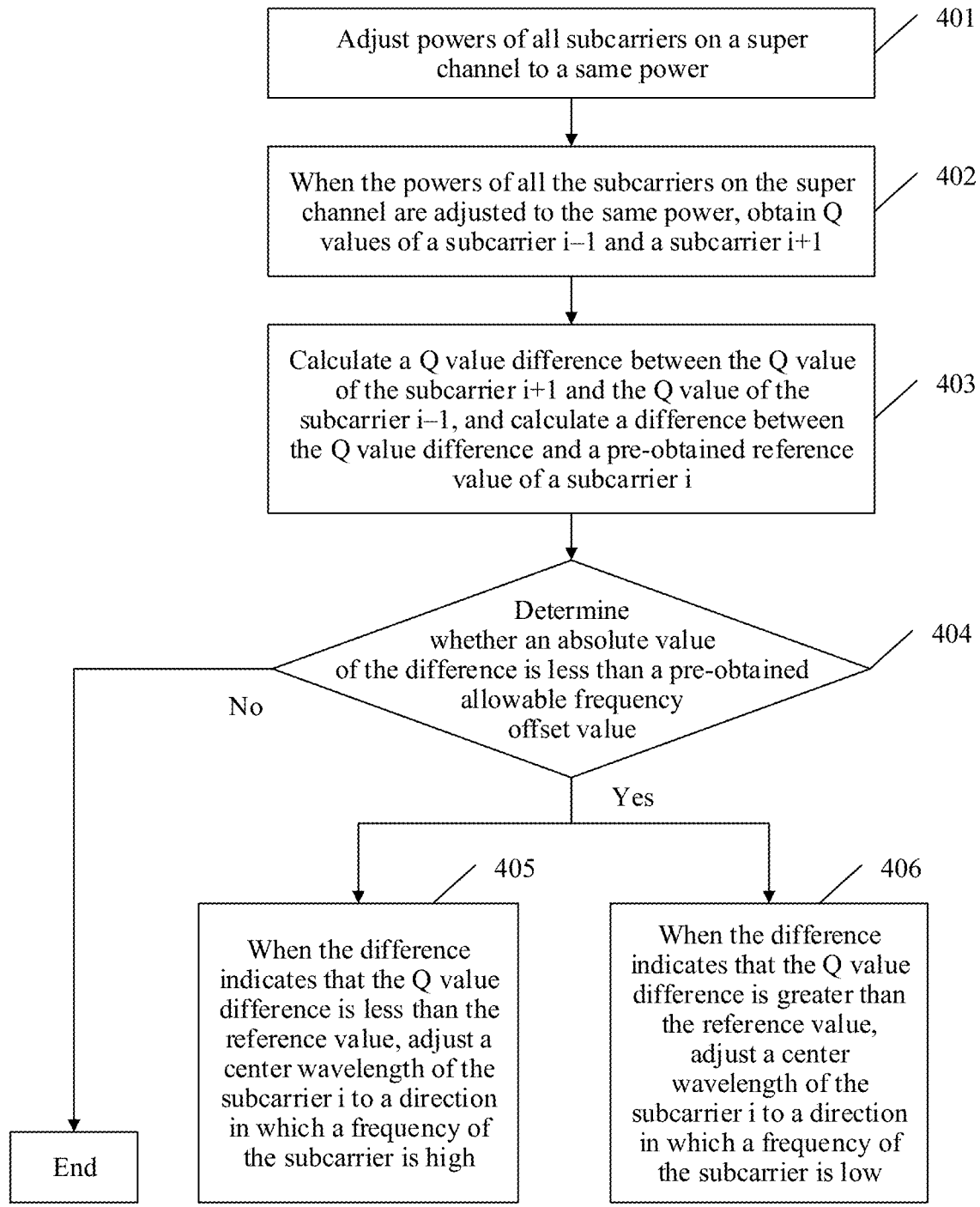
FIG. 4 is a schematic flowchart of another wavelength control method according to an embodiment of the present invention.

Referring to FIG. 4, FIG. 4 is a schematic flowchart of another wavelength control method according to an embodiment of the present invention. As shown in FIG. 4, the wavelength control method includes the following steps.

401. Adjust powers of all subcarriers on a super channel to a same power, where the super channel includes at least a subcarrier i−1, a subcarrier i, and a subcarrier i+1, the subcarrier i−1, the subcarrier i, and the subcarrier i+1 are consecutive subcarriers, and i is a positive integer greater than 1.

In this embodiment, the step of adjusting powers of all subcarriers on a super channel to a same power may include:

adjusting the powers of all the subcarriers on the super channel to a target power, where the target power belongs to a power-insensitive range, and the power-insensitive range means that when a power of a subcarrier changes in the range, a change magnitude of a Q value of the subcarrier is less than a preset threshold.

In the implementation, a power of each subcarrier is adjusted to the power-insensitive range. When the power of the subcarrier changes in the power-insensitive range, a change magnitude of a Q value of the subcarrier is less than the preset threshold. Therefore, the Q value of the subcarrier changes extremely slightly during calculation, so that detection precision of an offset of a center wavelength can be improved.

Figure 5:
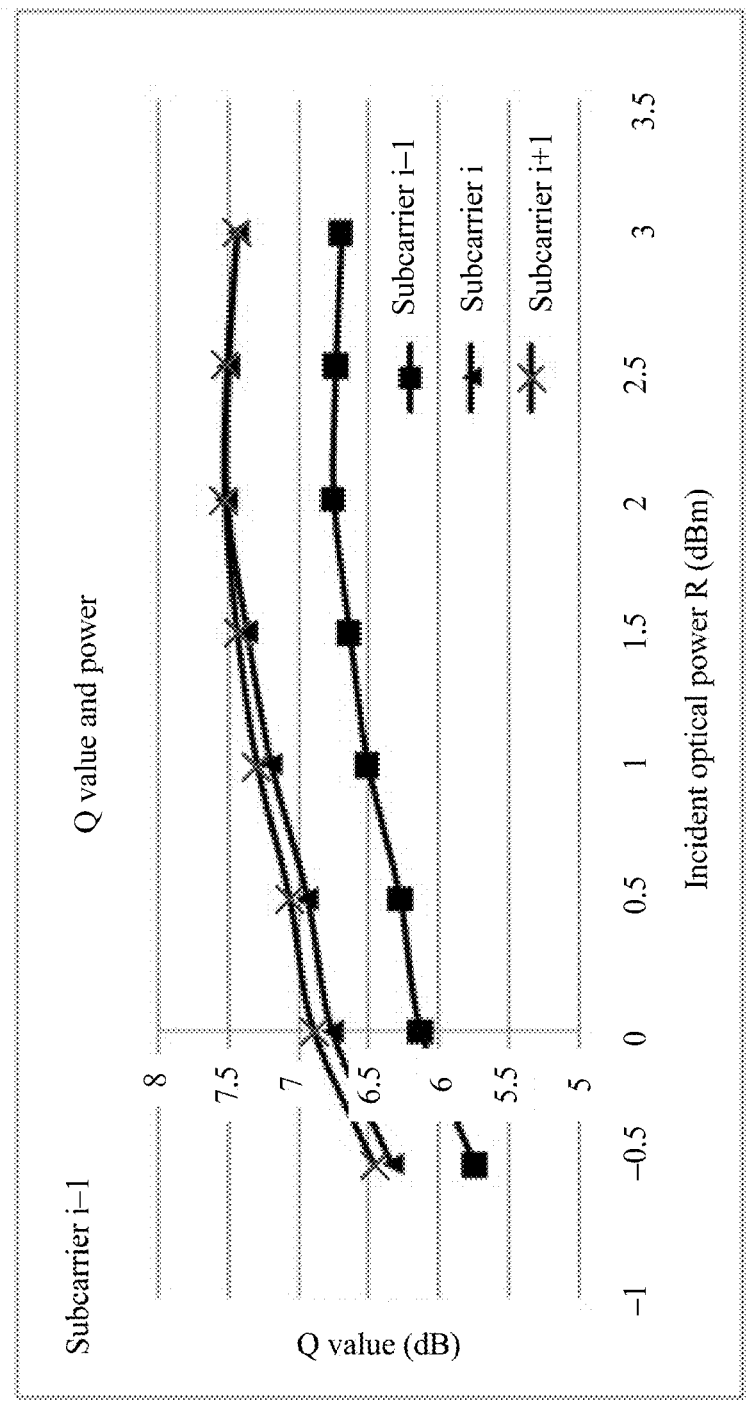
FIG. 5 is a schematic diagram of a relationship between a power and a Q value of a subcarrier according to an embodiment of the present invention.
Figure 6:
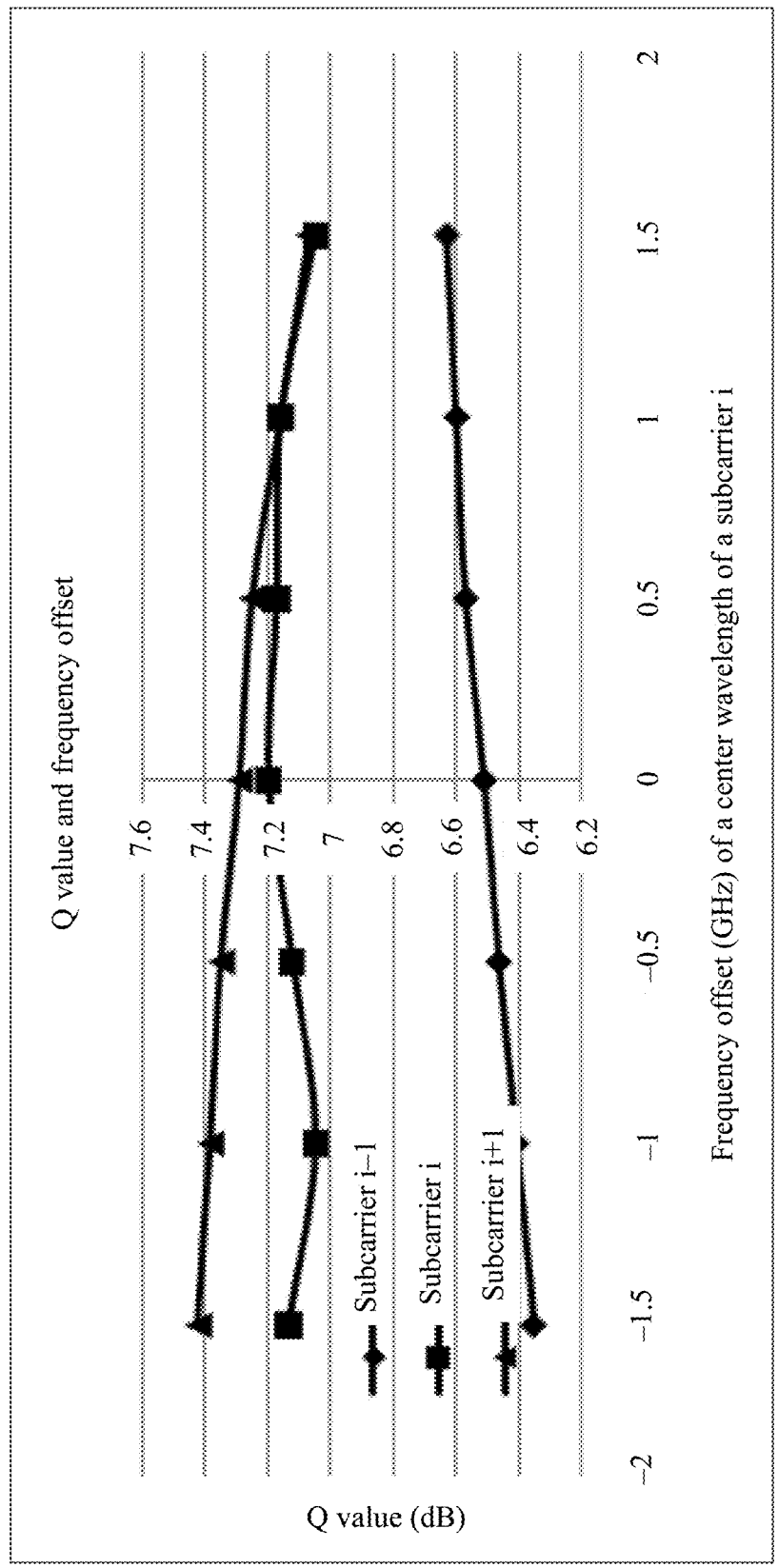
FIG. 6 is a schematic diagram of another relationship between a frequency offset and a Q value of a subcarrier according to an embodiment of the present invention.

Specifically, powers of each subcarrier that at a transmit end and a receive end each may be adjusted to a power in an range from 1.75 dBm to 2.25 dBm. In the range, when a power of the subcarrier changes by 1 dBm, a change in a Q value of the subcarrier ranges from 0.1 to 0.4. For example, the change may be indicated by 0.1 to 0.4 (unit: Q/dB). For example, as shown in FIG. 5, when an incident optical power of each subcarrier is around 0.5 dBm, a Q value of each subcarrier changes relatively obviously. In this case, the power range may be understood as a power-sensitive range. When the incident optical power of each subcarrier is around 2 dBm, the Q value of each subcarrier changes unobviously. In this case, the power range may be understood as a power-insensitive range. In addition, the incident optical power herein may be understood as a power at a transmit end of the subcarrier. In addition, it can be learned from FIG. 5 that when the power of the subcarrier is in the power-insensitive range, if the Q value of the subcarrier also changes, a factor of the power of the subcarrier is relatively small. Therefore, it may be learned that when the power of the subcarrier is in the power-insensitive range, if the Q value of the subcarrier changes, the change may be caused by a frequency offset of a center wavelength of the subcarrier. For example, as shown in FIG. 6, when a frequency offset of a center wavelength of the subcarrier i changes, the Q values of the subcarrier i−1, the subcarrier i, and the subcarrier i+1 change.

402. When the powers of all the subcarriers on the super channel are adjusted to the same power, obtain Q values of the subcarrier i−1 and the subcarrier i+1, where the Q values are used to indicate performance of the subcarriers.

403. Calculate a Q value difference between the Q value of the subcarrier i+1 and the Q value of the subcarrier i−1, and calculate a difference between the Q value difference and a pre-obtained reference value of the subcarrier i.

404. Determine whether an absolute value of the difference is less than a pre-obtained allowable frequency offset value; and perform step 405 or step 406 if the absolute value of the difference is not less than the pre-obtained allowable frequency offset value; or if the absolute value of the difference is less than the pre-obtained allowable frequency offset value, end the procedure, or adjust the powers of the subcarriers back to powers that have not been adjusted.

The allowable frequency offset value may be preset, for example, 0.5 GHz.

In the step, the Q values of the subcarrier i−1 and the subcarrier i+1 may be represented by Q'(i+1) and Q'(i−1), the Q value difference may be represented by waveREP(i)=Q'(i+1)−Q'(i−1), the reference value may be represented by wavebase(i), the difference may be represented by realoffset, and the allowable frequency offset may be represented by allow_offset. In this case, in the step, it may be set that realoffset=waveREP(i)−wavebase(i). If |realoffset|<allow_offset and Realoffset<0, step 405 is performed. If |realoffset|<allow_offset and Realoffset>0, step 406 may be performed.

405. When the difference indicates that the Q value difference is less than the reference value, adjust a center wavelength of the subcarrier i to a direction in which a frequency of the subcarrier is high, where whether a current difference is less than the allowable frequency offset value is calculated during adjustment, and the adjustment is ended when the current difference is less than the allowable frequency offset value.

406. When the difference indicates that the Q value difference is greater than the reference value, adjust a center wavelength of the subcarrier i to a direction in which a frequency of the subcarrier is low, where whether a current difference is less than the allowable frequency offset value is calculated during adjustment, and the adjustment is ended when the current difference is less than the allowable frequency offset value.

The current difference is a difference between a current Q value difference and the reference value, the current Q value difference is a Q value difference between a current Q value of the subcarrier i+1 and a current Q value of the subcarrier i−1, and the current Q value of the subcarrier i+1 and the current Q value of the subcarrier i−1 are respectively current Q values, obtained during the adjustment, of the subcarrier i+1 and the subcarrier i−1. In addition, the current Q values appeared herein are all real-time Q values. Because of adjustment of the center wavelength, the Q value of each subcarrier changes, so that the current Q value needs to be obtained.

It can be learned from step 405 that when the Q value difference calculated in step 403 is less than the reference value, the center wavelength of the subcarrier i may be adjusted to the direction in which the frequency of the subcarrier is high. The adjustment herein may be adjusting the center wavelength of the subcarrier i to a direction of a short wave of the subcarrier. Alternatively, the adjustment herein may be understood as increasing a frequency of the center wavelength of the subcarrier i or shortening a long wave of the center wavelength. In addition, the adjustment herein may be a plurality of fine adjustments. For example, an adjustment of 0.1 GHz or 0.2 GHz is performed each time. In addition, whether the current difference is less than the allowable frequency offset value may be further calculated during the adjustment, and the adjustment is ended when the current difference is less than the allowable frequency offset value.

It can be learned from step 406 that when the Q value difference calculated in step 403 is greater than the reference value, the center wavelength of the subcarrier i may be adjusted to the direction in which the frequency of the subcarrier is low. The adjustment herein may be adjusting the center wavelength of the subcarrier i to a direction of a long wave of the subcarrier. Alternatively, the adjustment herein may be understood as decreasing a frequency of the center wavelength of the subcarrier i or lengthening a long wave of the center wavelength. Likewise, the adjustment herein may be a plurality of fine adjustments, and the adjustment is ended when the current difference is less than the allowable frequency offset value.

It may be implemented by using the steps 405 and 406 that, when the center wavelength is adjusted, whether the current difference is less than the allowable frequency offset value is calculated, and the adjustment is ended when the current difference is less than the allowable frequency offset value, so that adjustment precision of the center wavelength can be improved.

In addition, in this embodiment, a wavelength control apparatus may further establish a mapping relationship for each subcarrier. The mapping relationship may include an OTU at a transmit end corresponding to the subcarrier, a wavelength control point, a power control point, and an OTU at a receive end. Certainly, the mapping relationship may further include a subcarrier power detection point. In this way, the wavelength control apparatus may detect a power of each subcarrier by using the mapping relationship, and performs operations, such as adjusting the power of each subcarrier, and adjusting a center wavelength of each subcarrier.

In this embodiment, before step 401, the method may further include the following steps:

adjusting the powers of all the subcarriers on the super channel to the power-insensitive range, where the power-insensitive range means that when a power of a subcarrier changes in the range, a change magnitude of a Q value of the subcarrier is less than the preset threshold;

obtaining N Q value sums when the powers, at a transmit end and a receive end, of all the subcarriers on the super channel are adjusted to the power-insensitive range, where the N Q value sums are sums, calculated when the center wavelength of the subcarrier i is at N different frequencies, of Q values of the subcarrier i−1, the subcarrier i, and the subcarrier i+1, and N is an integer greater than 1;

selecting a maximum Q value sum from the N Q value sums, and using, as the reference value, a Q value difference between a Q value of the subcarrier i+1 and a Q value of the subcarrier i−1, where the Q value of the subcarrier i+1 and the Q value of the subcarrier i−1 are used when the maximum Q value sum is calculated; and after the reference value is calculated, adjusting the powers of all the subcarriers on the super channel to powers that have not been adjusted to the power-insensitive range.

The obtaining N Q value sums may be as follows: The center wavelength of the subcarrier i is finely adjusted sequentially to a direction in which a frequency is high and to a direction in which the frequency is low, for example, an adjustment of 0.1 GHz or 0.5 GHz is performed each time, a sum of the Q values of the subcarrier i−1, the subcarrier i, and the subcarrier i+1 is obtained after each adjustment, and the N Q value sums may be obtained after N adjustments. Certainly, when the center wavelength of the subcarrier i is adjusted, a center wavelength of the subcarrier i−1 or the subcarrier i+1 may also be adjusted, to obtain the maximum Q value sum.

Figure 7:
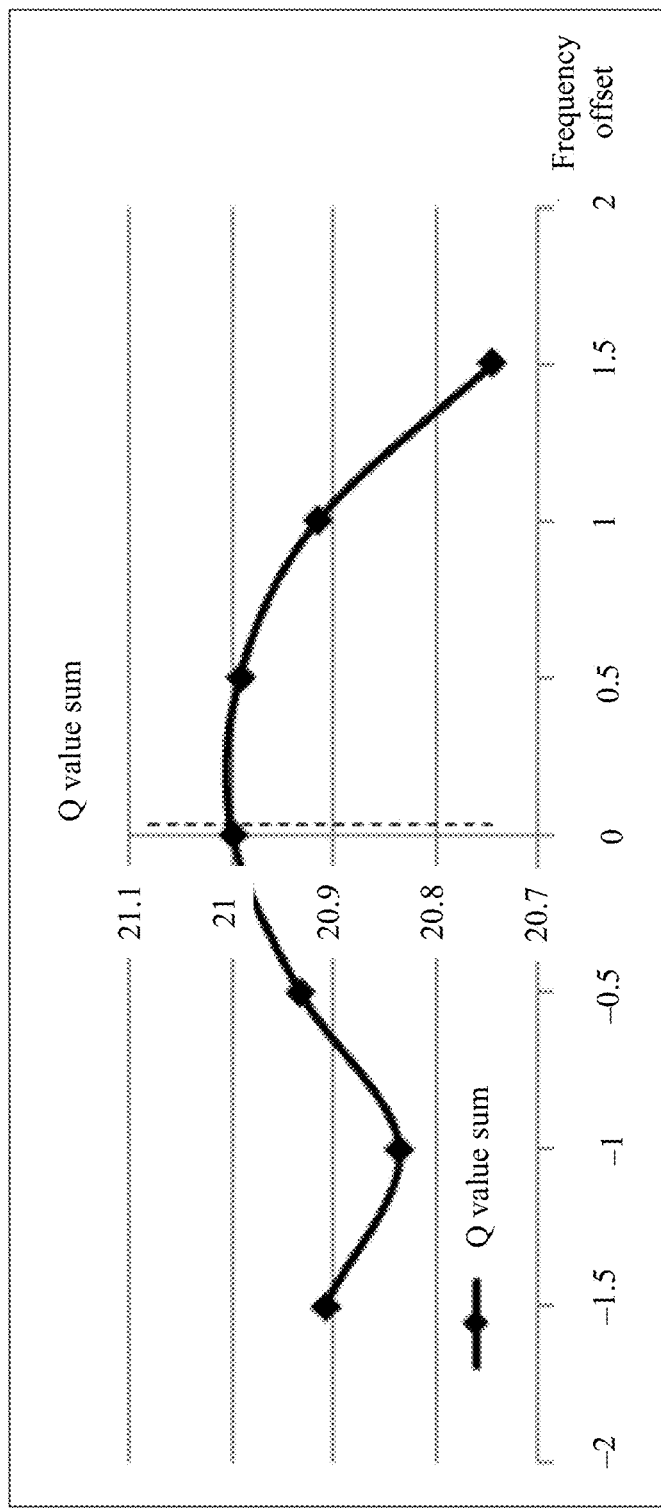
FIG. 7 is a schematic diagram of another relationship between a frequency offset and a Q value of a subcarrier according to an embodiment of the present invention.

When the N Q value sums are obtained, the maximum Q value sum may be selected from the N Q value sums. Further, the Q value difference between the Q value of the subcarrier i+1 and the Q value of the subcarrier i−1 may be used as the reference value, where the Q value of the subcarrier i+1 and the Q value of the subcarrier i−1 are used when the maximum Q value sum is calculated. Because whole performance of the three subcarriers is best when the Q value sum is maximum, a center wavelength of the subcarrier i is an optimum center wavelength when the maximum Q value sum is calculated. This is because it is learned from a large quantity of experiments that when powers of consecutive subcarriers are the same, a smaller frequency offset of a center wavelength of an intermediate subcarrier indicates better performance of these consecutive subcarriers. As shown in FIG. 7, when the Q value sum of three subcarriers is maximum, the frequency offset of the subcarrier i approximates 0. In this way, when powers at a transmit end and a receive end are level with each other by using each power leveling point of a subcarrier in a control system, a center wavelength of each subcarrier may be finely adjusted to find an optimum center wavelength of each subcarrier, and a difference of Q values of adjacent waves is recorded as a standard value.

In the implementation, the Q value difference between the Q value of the subcarrier i+1 and the Q value of the subcarrier i−1 that correspond to the maximum Q value sum may be selected as the reference value. A larger Q value indicates better performance of a subcarrier. Therefore, in the implementation, the calculated reference value is optimum, so that precision of adjusting the center wavelength of the subcarrier based on the reference value is also extremely high.

Certainly, in this embodiment, the standard value may be further preset, for example, the standard value is set by receiving an operation input by a user.

In this embodiment, the foregoing method may further include the following steps:

when a Q value of the subcarrier i is less than a preset threshold, determining whether a power of the subcarrier i is less than a power of an adjacent subcarrier; and if the power of the subcarrier i is less than the power of the adjacent subcarrier, adjusting the powers of all the subcarriers on the super channel to a preset initial power, where the adjacent subcarrier includes at least one of the subcarrier i−1 or the subcarrier i+1; and performing step 401 if the power of the subcarrier i is not less than the power of the adjacent subcarrier.

In the implementation, the determining whether a power of the subcarrier i is less than a power of an adjacent subcarrier may be determining whether a relative power of the subcarrier i is less than a relative power of the adjacent subcarrier. Certainly, the relative power herein may be a relative function of the receive end or a relative power at the transmit end. The adjusting the powers of all the subcarriers on the super channel to a preset initial power may be adjusting the power of each subcarrier to the initial power by using a variable optical attenuator (Variable Optical Attenuator, VOA) at a power equilibrium point of the subcarrier.

In addition, when whether the power of the subcarrier i is less than the power of the adjacent subcarrier is determined, whether the powers of all the subcarriers on the super channel all change may be determined, for example, whether absolute powers of all the subcarriers all decrease may be determined. If the powers of all the subcarriers on the super channel all change, an adjustment of a VOA of a main path corresponding to the super channel or an adjustment of an optical amplifier gain may be triggered.

In addition, in the implementation, step 401 may be performed when the absolute powers of the subcarriers do not change, and the power of the subcarrier i is not less than the power of the adjacent subcarrier.

In the implementation, a power of each subcarrier may be adjusted when a Q value of the subcarrier decreases, to improve performance of the subcarrier. Alternatively, a center wavelength of the subcarrier may be adjusted, to improve performance of the subcarrier.

Certainly, step 401 may be further performed periodically or performed at some specific time points, to adjust the center wavelength of the subcarrier i, so that the frequency offset of the center wavelength of the subcarrier i is controlled within a range of ±0.5 GHz.

A specific example is provided below.

Boards numbered 10, 15, and 12 of the transmit end send three adjacent subcarriers that are separated by 37.5 GHz, and the three adjacent subcarriers are respectively a subcarrier 12, a subcarrier 15, and a subcarrier 10. The subcarrier 12, the subcarrier 15, and the subcarrier 10 are consecutive. When powers of the subcarriers are equal to each other, tested Q values of the boards are shown in Table 1. In addition, if it is found in practice that performance of an OTU becomes better or worse, there are three possible cases: (1) The power of the subcarrier becomes much lower; (2) the powers of all the subcarriers become low; (3) the powers of all the subcarriers stay the same, but a wavelength has an offset. Table 1 represents the first two cases.

TABLE 1

| BID | Incident optical power (dBm) | | | | | | | |
| --- | --- | --- | --- | --- | --- | --- | --- | --- |
| | −0.5 | 0 | 0.5 | 1 | 1.5 | 2 | 2.5 | 3 |
| 10 | 5.740971 | 6.131703 | 6.277605 | 6.507794 | 6.636782 | 6.751328 | 6.730004 | 6.698101 |
| 15 | 6.331145 | 6.761989 | 6.94025 | 7.19815 | 7.369379 | 7.509579 | 7.495693 | 7.433211 |
| 12 | 6.460367 | 6.893937 | 7.059411 | 7.292091 | 7.431723 | 7.522131 | 7.50801 | 7.433211 |
| Q12 to Q10 | 0.719396 | 0.762234 | 0.781806 | 0.784296 | 0.794941 | 0.770804 | 0.778006 | 0.735109 |
| Average Q value | 6.17749 | 6.59588 | 6.75909 | 6.99934 | 7.14596 | 7.26101 | 7.24457 | 7.18817 |

It can be learned from above that if optical powers are different, an absolute difference between Q values is relatively large. Generally, when the absolute difference is 1 dBm, a change in a Q value ranges from 0.1 to 0.9 and may be indicated by 0.1 to 0.9 (unit/dB).

This embodiment of the present invention may include the following steps.

1. Adjust powers of all subcarriers on a tested super channel to a power-insensitive range, for example, increase all the powers to 1 dBm, where a change in a Q value in the power-insensitive range is 0.1 to 0.4 (unit: Q/1 dB).

2. Detect the power of each subcarrier, and control the power of the subcarrier by using a system, where a difference between the powers of the subcarriers may be controlled within ±0.1 dBm, and in this case, a difference between absolute values of Q values ranges from 0.02 to 0.08.

3. Finely adjust a center wavelength of the subcarrier 15 to the left and to the right, to find a point at which a comprehensive Q value of the three adjacent subcarriers is maximum, record a center wavelength of the subcarrier 15 as an optimum center wavelength in this case, and record, as a reference value, a difference between Q values of the subcarrier 12 and the subcarrier 10 in this case.

4. Recover the power of each subcarrier to a normal operating power, and start a timing task.

5. After a timed time arrives, increase a power of a super channel in the system, where a power of only one super channel in the system can be increased once; query and observe the difference between the Q values of the subcarrier 12 and the subcarrier 10; compare the difference with the reference value to analyze an offset of the center wavelength of the subcarrier 15 in this case; and then start to feed back the offset and adjust the center wavelength of the subcarrier 15 until the frequency offset of the center wavelength of the subcarrier 15 falls within ±0.5 GHz.

6. After the center wavelength is adjusted to a target frequency offset control range, recover the power of each subcarrier to an initial state.

7. Increase the power of each subcarrier to the power-insensitive range.

In this case, impact of the offset of the center wavelength on the difference between the Q values of the subcarrier 12 and the subcarrier 10 may be determined. Details may be shown in FIG. 8. It can be learned from FIG. 7 that a location at which a Q value sum of the three subcarriers is maximum is an initial optimum wavelength point, and a corresponding difference between the Q values of the subcarrier 12 and the subcarrier 10 is 0.784. However, as long as the center wavelength of the subcarrier 15 has a slight offset, for example, when the center wavelength is 0.5 GHz, the difference between the Q values of the subcarrier 12 and the subcarrier 10 is 0.685, and a difference between the difference of 0.685 and the difference of 0.784 obtained when there is no frequency offset is around 0.1. It can be learned that the Q value difference herein may be completely identified, and may be used to feed back to control the frequency offset of the center wavelength of the subcarrier 15.

The following are apparatus embodiments of the present invention. The apparatus embodiments of the present invention are used to perform the methods implemented in the method embodiments of the present invention. For ease of description, only parts related to the embodiments of the present invention are shown. For specific technical details undisclosed, refer to the method embodiments of the present invention.

Figure 9:
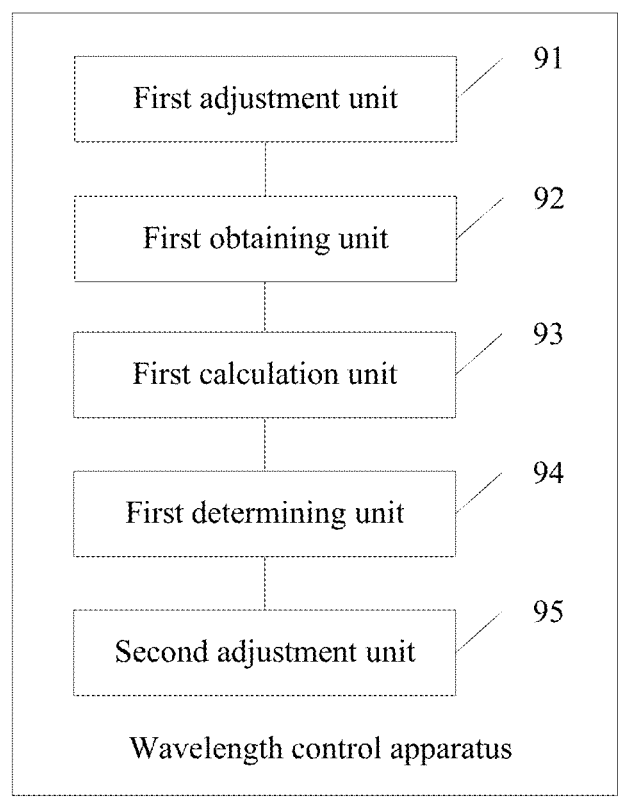
FIG. 9 is a schematic structural diagram of a wavelength control apparatus according to an embodiment of the present invention.

Referring to FIG. 9, FIG. 9 is a schematic structural diagram of a wavelength control apparatus according to an embodiment of the present invention. As shown in FIG. 9, the wavelength control apparatus includes: a first adjustment unit 91, a first obtaining unit 92, a first calculation unit 93, a first determining unit 94, and a second adjustment unit 95.

The first adjustment unit 91 is configured to adjust powers of all subcarriers on a super channel to a same power, where the super channel includes at least a subcarrier i−1, a subcarrier i, and a subcarrier i+1, the subcarrier i−1, the subcarrier i, and the subcarrier i+1 are consecutive subcarriers, and i is a positive integer greater than 1.

The first obtaining unit 92 is configured to: when the powers of all the subcarriers on the super channel are adjusted to the same power, obtain Q values of the subcarrier i−1 and the subcarrier i+1, where the Q values are used to indicate performance of the subcarriers.

The first calculation unit 93 is configured to: calculate a Q value difference between the Q value of the subcarrier i+1 and the Q value of the subcarrier i−1, and calculate a difference between the Q value difference and a pre-obtained reference value of the subcarrier i.

The first determining unit 94 is configured to determine whether an absolute value of the difference is less than a pre-obtained allowable frequency offset value.

The second adjustment unit 95 is configured to: if the first determining unit 94 determines that the absolute value of the difference is not less than the allowable frequency offset value, adjust a center wavelength of the subcarrier i according to the difference.

Optionally, the second adjustment unit 95 may be configured to: when the difference indicates that the Q value difference is less than the reference value, adjust the center wavelength of the subcarrier i to a direction in which a frequency of the subcarrier is high, where whether a current difference is less than the allowable frequency offset value is calculated during adjustment, and the adjustment is ended when the current difference is less than the allowable frequency offset value.

The second adjustment unit 95 may be further configured to: when the difference indicates that the Q value difference is greater than the reference value, adjust the center wavelength of the subcarrier i to a direction in which a frequency of the subcarrier is low, where whether a current difference is less than the allowable frequency offset value is calculated during adjustment, and the adjustment is ended when the current difference is less than the allowable frequency offset value.

The current difference is a difference between a current Q value difference and the reference value, the current Q value difference is a Q value difference between a current Q value of the subcarrier i+1 and a current Q value of the subcarrier i−1, and the current Q value of the subcarrier i+1 and the current Q value of the subcarrier i−1 are respectively current Q values, obtained during the adjustment, of the subcarrier i+1 and the subcarrier i−1.

Optionally, the first adjustment unit 91 may be configured to adjust the powers of all the subcarriers on the super channel to a target power, where the target power belongs to a power-insensitive range, and the power-insensitive range means that when a power of a subcarrier changes in the range, a change magnitude of a Q value of the subcarrier is less than a preset threshold.

Figure 10:
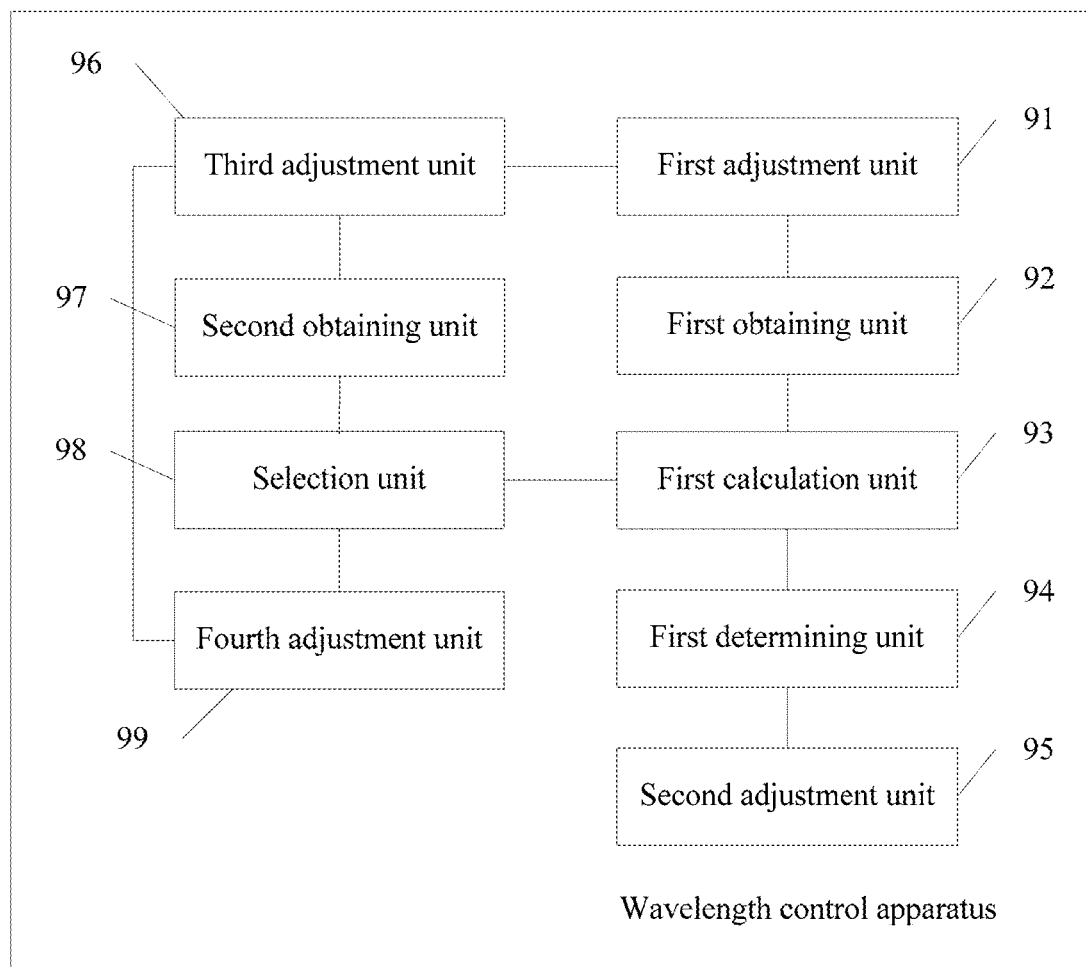
FIG. 10 is a schematic structural diagram of another wavelength control apparatus according to an embodiment of the present invention.

Optionally, as shown in FIG. 10, the apparatus may further include:

a third adjustment unit 96, configured to adjust the powers of all the subcarriers on the super channel to the power-insensitive range, where the power-insensitive range means that when a power of a subcarrier changes in the range, a change magnitude of a Q value of the subcarrier is less than the preset threshold;

a second obtaining unit 97, configured to obtain N Q value sums when the powers, at a transmit end and a receive end, of all the subcarriers on the super channel are adjusted to the power-insensitive range, where the N Q value sums are sums, calculated when the center wavelength of the subcarrier i is at N different frequencies, of Q values of the subcarrier i−1, the subcarrier i, and the subcarrier i+1, and N is an integer greater than 1;

a selection unit 98, configured to: select a maximum Q value sum from the N Q value sums, and use, as the reference value, a Q value difference between a Q value of the subcarrier i+1 and a Q value of the subcarrier i−1, where the Q value of the subcarrier i+1 and the Q value of the subcarrier i−1 are used when the maximum Q value sum is calculated; and a fourth adjustment unit 99, configured to: after the reference value is calculated, adjust the powers of all the subcarriers on the super channel to powers that have not been adjusted by the third adjustment unit.

Figure 11:
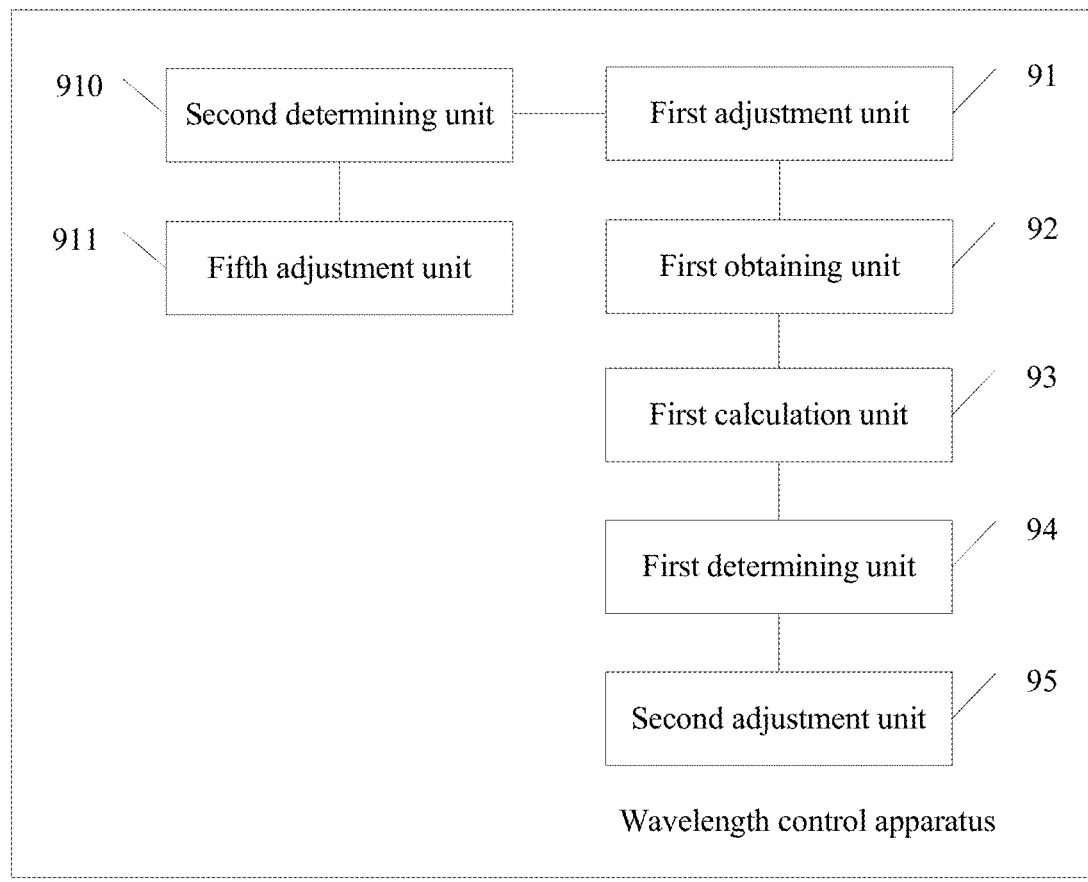
FIG. 11 is a schematic structural diagram of another wavelength control apparatus according to an embodiment of the present invention.

Optionally, as shown in FIG. 11, the apparatus may further include:

a second determining unit 910, configured to: when a Q value of the subcarrier i is less than a preset threshold, determine whether a power of the subcarrier i is less than a power of an adjacent subcarrier; and a fifth adjustment unit 911, configured to: if the second determining unit determines that the power of the subcarrier i is less than the power of the adjacent subcarrier, adjust the powers of all the subcarriers on the super channel to a preset initial power, where the adjacent subcarrier includes at least one of the subcarrier i−1 or the subcarrier i+1.

The first adjustment unit 91 is configured to: if the second determining unit 910 determines that the power of the subcarrier i is not less than the power of the adjacent subcarrier, adjust the powers of all the subcarriers on the super channel to the same power.

In this embodiment, the center wavelength of the subcarrier i may be adjusted according to the difference between the reference value and the difference between the Q values of the subcarrier i+1 and the subcarrier i−1. It is found in practice that a difference between Q values of two adjacent subcarriers of an intermediate subcarrier is in a linear relationship with a frequency offset of the intermediate subcarrier. Therefore, the center wavelength of the subcarrier i can be precisely controlled.

Figure 12:
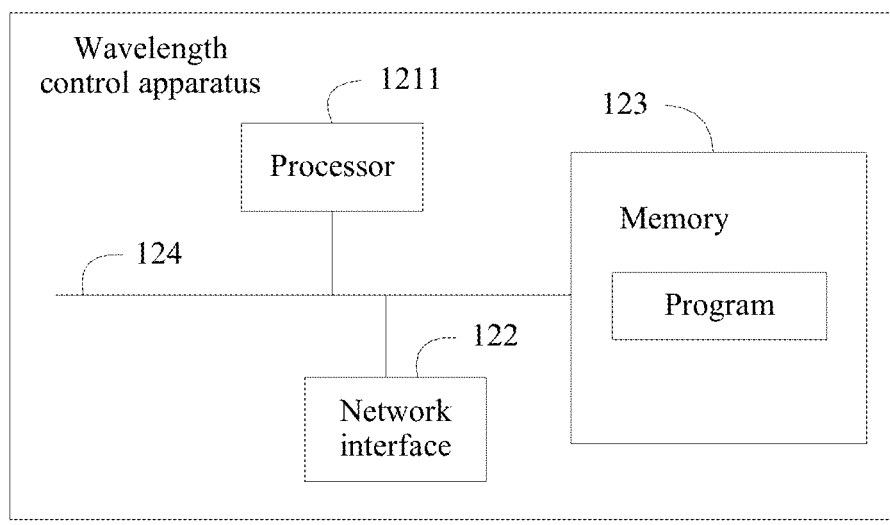
FIG. 12 is a schematic structural diagram of another wavelength control apparatus according to an embodiment of the present invention.

Referring to FIG. 12, FIG. 12 is a schematic structural diagram of another wavelength control apparatus according to an embodiment of the present invention. As shown in FIG. 12, the wavelength control apparatus includes: a processor 121, a network interface 122, a memory 123, and a communications bus 124. The communications bus 124 is configured to implement connection and communication between the processor 121, the network interface 122, the memory 123, and the processor 121 executes a program stored in the memory 123 to implement the following method:

adjusting powers of all subcarriers on a super channel to a same power, where the super channel includes at least a subcarrier i−1, a subcarrier i, and a subcarrier i+1, the subcarrier i−1, the subcarrier i, and the subcarrier i+1 are consecutive subcarriers, and i is a positive integer greater than 1;

when the powers of all the subcarriers on the super channel are adjusted to the same power, obtaining Q values of the subcarrier i−1 and the subcarrier i+1, where the Q values are used to indicate performance of the subcarriers;

calculating a Q value difference between the Q value of the subcarrier i+1 and the Q value of the subcarrier i−1, and calculating a difference between the Q value difference and a pre-obtained reference value of the subcarrier i; and determining whether an absolute value of the difference is less than a pre-obtained allowable frequency offset value, and if the absolute value of the difference is not less than the pre-obtained allowable frequency offset value, adjusting a center wavelength of the subcarrier i according to the difference.

Optionally, the program, executed by the processor 121, of adjusting a center wavelength of the subcarrier i according to the difference may include:

when the difference indicates that the Q value difference is less than the reference value, adjusting the center wavelength of the subcarrier i to a direction in which a frequency of the subcarrier is high, where whether a current difference is less than the allowable frequency offset value is calculated during adjustment, and the adjustment is ended when the current difference is less than the allowable frequency offset value; or when the difference indicates that the Q value difference is greater than the reference value, adjusting the center wavelength of the subcarrier i to a direction in which a frequency of the subcarrier is low, where whether a current difference is less than the allowable frequency offset value is calculated during adjustment, and the adjustment is ended when the current difference is less than the allowable frequency offset value.

The current difference is a difference between a current Q value difference and the reference value, the current Q value difference is a Q value difference between a current Q value of the subcarrier i+1 and a current Q value of the subcarrier i−1, and the current Q value of the subcarrier i+1 and the current Q value of the subcarrier i−1 are respectively current Q values, obtained during the adjustment, of the subcarrier i+1 and the subcarrier i−1.

Optionally, the program, executed by the processor 121, of adjusting powers of all subcarriers on a super channel to a same power may include:

adjusting the powers of all the subcarriers on the super channel to a target power, where the target power belongs to a power-insensitive range, and the power-insensitive range means that when a power of a subcarrier changes in the range, a change magnitude of a Q value of the subcarrier is less than a preset threshold.

Optionally, before the program, executed by the processor 121, of adjusting powers of all subcarriers on a super channel to a same power, the program executed by the processor 121 may further include:

adjusting the powers of all the subcarriers on the super channel to the power-insensitive range, where the power-insensitive range means that when a power of a subcarrier changes in the range, a change magnitude of a Q value of the subcarrier is less than the preset threshold;

obtaining N Q value sums when the powers, at a transmit end and a receive end, of all the subcarriers on the super channel are adjusted to the power-insensitive range, where the N Q value sums are sums, calculated when the center wavelength of the subcarrier i is at N different frequencies, of Q values of the subcarrier i−1, the subcarrier i, and the subcarrier i+1, and N is an integer greater than 1;

selecting a maximum Q value sum from the N Q value sums, and using, as the reference value, a Q value difference between a Q value of the subcarrier i+1 and a Q value of the subcarrier i−1, where the Q value of the subcarrier i+1 and the Q value of the subcarrier i−1 are used when the maximum Q value sum is calculated; and after the reference value is calculated, adjusting the powers of all the subcarriers on the super channel to powers that have not been adjusted to the power-insensitive range.

Optionally, the program executed by the processor 121 may further include:

when a Q value of the subcarrier i is less than a preset threshold, determining whether a power of the subcarrier i is less than a power of an adjacent subcarrier; and if the power of the subcarrier i is less than the power of the adjacent subcarrier, adjusting the powers of all the subcarriers on the super channel to a preset initial power, where the adjacent subcarrier includes at least one of the subcarrier i−1 or the subcarrier i+1; and if the power of the subcarrier i is not less than the power of the adjacent subcarrier, performing the step of adjusting powers of all subcarriers on a super channel to a same power.

In this embodiment, the center wavelength of the subcarrier i may be adjusted according to the difference between the reference value and the difference between the Q values of the subcarrier i+1 and the subcarrier i−1. It is found in practice that a difference between Q values of two adjacent subcarriers of an intermediate subcarrier is in a linear relationship with a frequency offset of the intermediate subcarrier. Therefore, the center wavelength of the subcarrier i can be precisely controlled.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disc, an optical disc, a read-only memory (ROM), or a random access memory (RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A wavelength control method, comprising:
    adjusting, by a wavelength control apparatus, powers of subcarriers on a super channel to a same power, wherein the subcarriers on the super channel comprises at least a sub carrier i−1, a subcarrier i, and a subcarrier i+1, the subcarrier i−1, the subcarrier i, and the subcarrier i+1 are consecutive subcarriers, and i is a positive integer greater than 1;
    when the powers of the subcarriers on the super channel are adjusted to the same power, obtaining, by the wavelength control apparatus, Q values of the subcarrier i−1 and the subcarrier i+1, wherein the Q values indicate performance of the subcarriers;
    calculating, by the wavelength control apparatus, a Q value difference between the Q value of the subcarrier i+1 and the Q value of the subcarrier i−1;
    calculating, by the wavelength control apparatus, a difference between the Q value difference and a pre-obtained reference value of the subcarrier i;
    determining, by the wavelength control apparatus, whether an absolute value of the difference is less than a pre-obtained allowable frequency offset value; and
    if the absolute value of the difference is not less than the pre-obtained allowable frequency offset value, adjusting, by the wavelength control apparatus, a center wavelength of the subcarrier i according to the difference.

2. The method according to claim 1, wherein the adjusting, by the wavelength control apparatus, the center wavelength of the subcarrier i according to the difference comprises:
    when the difference indicates that the Q value difference is less than the reference value, adjusting the center wavelength of the subcarrier i to a direction in which a frequency of the subcarrier is increased, determining, by the wavelength control apparatus, whether a current difference is less than the allowable frequency offset value during the adjusting, and stopping the adjusting when the current difference is less than the allowable frequency offset value; or
    when the difference indicates that the Q value difference is greater than the reference value, adjusting the center wavelength of the subcarrier i to a direction in which a frequency of the subcarrier is decreased, determining, by the wavelength control apparatus, whether the current difference is less than the allowable frequency offset value during the adjusting, and stopping the adjusting when the current difference is less than the allowable frequency offset value, wherein
    the current difference is a difference between a current Q value difference and the reference value, the current Q value difference is a Q value difference between a current Q value of the subcarrier i+1 and a current Q value of the subcarrier i−1, and the current Q value of the subcarrier i+1 and the current Q value of the subcarrier i−1 are respectively current Q values that are obtained during adjusting the center wavelength of the subcarrier i+1 and the subcarrier i−1.

3. The method according to claim 1, wherein the adjusting, by the wavelength control apparatus, powers of the subcarriers on the super channel to the same power comprises:
    adjusting, by the wavelength control apparatus, the powers of the subcarriers on the super channel to a target power, wherein the target power belongs to a power-insensitive range, and when a power of a subcarrier changes within the power-insensitive range, a change magnitude of a Q value of the subcarrier is less than a preset threshold.

4. The method according to claim 1, wherein before the adjusting powers of the subcarriers on the super channel to the same power, the method further comprises:
    adjusting, by the wavelength control apparatus, the powers of the subcarriers on the super channel to a power-insensitive range, wherein when a power of a subcarrier changes within the power-insensitive range, a change magnitude of a Q value of the subcarrier is less than a preset threshold;
    obtaining, by the wavelength control apparatus, N Q value sums when the powers, at a transmit end and a receive end, of the subcarriers on the super channel are adjusted to the power-insensitive range, wherein the N Q value sums are sums that are calculated when the center wavelength of the subcarrier i is at N different frequencies, of Q values of the subcarrier i−1, the subcarrier i, and the subcarrier i+1, and N is an integer greater than 1;
    selecting, by the wavelength control apparatus, a maximum Q value sum from the N Q value sums;
    using, by the wavelength control apparatus, as the reference value, a Q value difference between a Q value of the subcarrier i+1 and a Q value of the subcarrier i−1, wherein the Q value of the subcarrier i+1 and the Q value of the subcarrier i−1 are used when the maximum Q value sum is calculated; and after the reference value is calculated, adjusting, by the wavelength control apparatus, the powers of the subcarriers on the super channel to powers that have not been adjusted to the power-insensitive range.

5. The method according to claim 1, wherein the method further comprises:

when a Q value of the subcarrier i is less than a preset threshold, determining, by the wavelength control apparatus, whether a power of the subcarrier i is less than a power of an adjacent sub carrier;

if the power of the subcarrier i is less than the power of the adjacent subcarrier, adjusting, by the wavelength control apparatus, the powers of the subcarriers on the super channel to a preset initial power, wherein the adjacent subcarrier comprises at least one of the subcarrier i−1 or the subcarrier i+1; and if the power of the subcarrier i is not less than the power of the adjacent subcarrier, performing, by the wavelength control apparatus, the step of adjusting the powers of the subcarriers on the super channel to the same power.

6. A non-transitory computer-readable medium storing computer instructions, that when executed by one or more hardware processors, cause the one or more hardware processors to perform operations comprising:

adjusting powers of subcarriers on a super channel to a same power, wherein the subcarriers on the super channel comprises at least a subcarrier i−1, a subcarrier i, and a subcarrier i+1, the subcarrier i−1, the subcarrier i, and the subcarrier i+1 are consecutive subcarriers, and i is a positive integer greater than 1;

when the powers of the subcarriers on the super channel are adjusted to the same power, obtaining Q values of the subcarrier i−1 and the subcarrier i+1, wherein the Q values indicate performance of the subcarriers;

calculating a Q value difference between the Q value of the subcarrier i+1 and the Q value of the subcarrier i−1;

calculating a difference between the Q value difference and a pre-obtained reference value of the subcarrier i;

determining whether an absolute value of the difference is less than a pre-obtained allowable frequency offset value; and if the absolute value of the difference is not less than the pre-obtained allowable frequency offset value, adjusting a center wavelength of the subcarrier i according to the difference.

7. The non-transitory computer-readable medium according to claim 6, wherein the adjusting the center wavelength of the subcarrier i according to the difference comprises:

when the difference indicates that the Q value difference is less than the reference value, adjusting the center wavelength of the subcarrier i to a direction in which a frequency of the subcarrier is increased, determining whether a current difference is less than the allowable frequency offset value during the adjusting, and stopping the adjusting when the current difference is less than the allowable frequency offset value; or when the difference indicates that the Q value difference is greater than the reference value, adjusting the center wavelength of the subcarrier i to a direction in which a frequency of the subcarrier is decreased, determining whether the current difference is less than the allowable frequency offset value during the adjusting, and stopping the adjusting when the current difference is less than the allowable frequency offset value, wherein the current difference is a difference between a current Q value difference and the reference value, the current Q value difference is a Q value difference between a current Q value of the subcarrier i+1 and a current Q value of the subcarrier i−1, and the current Q value of the subcarrier i+1 and the current Q value of the subcarrier i−1 are respectively current Q values that are obtained during adjusting the center wavelength of the subcarrier i+1 and the subcarrier i−1.

8. The non-transitory computer-readable medium according to claim 6, wherein the adjusting powers of the subcarriers on the super channel to the same power comprises:

adjusting the powers of the subcarriers on the super channel to a target power, wherein the target power belongs to a power-insensitive range, and when a power of a subcarrier changes within the power-insensitive range, a change magnitude of a Q value of the subcarrier is less than a preset threshold.

9. The non-transitory computer-readable medium according to claim 6, wherein before the adjusting powers of the subcarriers on the super channel to the same power, the operations further comprise:

adjusting the powers of the subcarriers on the super channel to a power-insensitive range, wherein when a power of a subcarrier changes within the power-insensitive range, a change magnitude of a Q value of the subcarrier is less than a preset threshold;

obtaining N Q value sums when the powers, at a transmit end and a receive end, of the subcarriers on the super channel are adjusted to the power-insensitive range, wherein the N Q value sums are sums that are calculated when the center wavelength of the subcarrier i is at N different frequencies, of Q values of the subcarrier i−1, the subcarrier i, and the subcarrier i+1, and N is an integer greater than 1;

selecting a maximum Q value sum from the N Q value sums;

using, as the reference value, a Q value difference between a Q value of the subcarrier i+1 and a Q value of the subcarrier i−1, wherein the Q value of the subcarrier i+1 and the Q value of the subcarrier i−1 are used when the maximum Q value sum is calculated; and after the reference value is calculated, adjusting the powers of the subcarriers on the super channel to powers that have not been adjusted to the power-insensitive range.

10. The non-transitory computer-readable medium according to claim 6, wherein the operations further comprise:

when a Q value of the subcarrier i is less than a preset threshold, determining whether a power of the subcarrier i is less than a power of an adjacent subcarrier;

if the power of the subcarrier i is less than the power of the adjacent subcarrier, adjusting the powers of the subcarriers on the super channel to a preset initial power, wherein the adjacent subcarrier comprises at least one of the subcarrier i−1 or the subcarrier i+1; and if the power of the subcarrier i is not less than the power of the adjacent subcarrier, performing the step of adjusting the powers of the subcarriers on the super channel to the same power.

11. A wavelength control apparatus, comprising: a processor, a network interface, a memory, and a communications bus, wherein the communications bus is configured to implement connection and communication between the processor, the network interface, and the memory, and the processor executes a program stored in the memory to implement the following operations:

adjusting powers of subcarriers on a super channel to a same power, wherein the subcarriers on the super channel comprises at least a subcarrier i−1, a subcarrier i, and a subcarrier i+1, the subcarrier i−1, the subcarrier i, and the subcarrier i+1 are consecutive subcarriers, and i is a positive integer greater than 1;

when the powers of the subcarriers on the super channel are adjusted to the same power, obtaining Q values of the subcarrier i−1 and the subcarrier i+1, wherein the Q values indicate performance of the subcarriers;

calculating a Q value difference between the Q value of the subcarrier i+1 and the Q value of the subcarrier i−1;

calculating a difference between the Q value difference and a pre-obtained reference value of the subcarrier i;

determining whether an absolute value of the difference is less than a pre-obtained allowable frequency offset value; and if the absolute value of the difference is not less than the pre-obtained allowable frequency offset value, adjusting a center wavelength of the subcarrier i according to the difference.

12. The wavelength control apparatus according to claim 11, wherein the adjusting the center wavelength of the subcarrier i according to the difference comprises:

when the difference indicates that the Q value difference is less than the reference value, adjusting the center wavelength of the subcarrier i to a direction in which a frequency of the subcarrier is increased, determining whether a current difference is less than the allowable frequency offset value during the adjusting, and stopping the adjusting when the current difference is less than the allowable frequency offset value; or when the difference indicates that the Q value difference is greater than the reference value, adjusting the center wavelength of the subcarrier i to a direction in which a frequency of the subcarrier is decreased, determining whether a current difference is less than the allowable frequency offset value during the adjusting, and stopping the adjusting when the current difference is less than the allowable frequency offset value, wherein the current difference is a difference between a current Q value difference and the reference value, the current Q value difference is a Q value difference between a current Q value of the subcarrier i+1 and a current Q value of the subcarrier i−1, and the current Q value of the subcarrier i+1 and the current Q value of the subcarrier i−1 are respectively current Q values that are obtained during adjusting the center wavelengths of the subcarrier i+1 and the subcarrier i−1.

13. The wavelength control apparatus according to claim 11, wherein the adjusting powers of the subcarriers on the super channel to the same power comprises:

adjusting the powers of the subcarriers on the super channel to a target power, wherein the target power belongs to a power-insensitive range, and when a power of a subcarrier changes within the power-insensitive range, a change magnitude of a Q value of the subcarrier is less than a preset threshold.

14. The wavelength control apparatus according to claim 11, wherein before the adjusting powers of the subcarriers on the super channel to the same power, the operations further comprise:

adjusting the powers of the subcarriers on the super channel to a power-insensitive range, wherein when a power of a subcarrier changes within the power-insensitive range, a change magnitude of a Q value of the subcarrier is less than a preset threshold;

obtaining N Q value sums when the powers, at a transmit end and a receive end, of the subcarriers on the super channel are adjusted to the power-insensitive range, wherein the N Q value sums are sums that are calculated when the center wavelength of the subcarrier i is at N different frequencies, of Q values of the subcarrier i−1, the subcarrier i, and the subcarrier i+1, and N is an integer greater than 1;

selecting a maximum Q value sum from the N Q value sums;

using, as the reference value, a Q value difference between a Q value of the subcarrier i+1 and a Q value of the subcarrier i−1, wherein the Q value of the subcarrier i+1 and the Q value of the subcarrier i−1 are used when the maximum Q value sum is calculated; and after the reference value is calculated, adjusting the powers of the subcarriers on the super channel to powers that have not been adjusted to the power-insensitive range.

15. The wavelength control apparatus according to claim 11, wherein the operations further comprise:

when a Q value of the subcarrier i is less than a preset threshold, determining whether a power of the subcarrier i is less than a power of an adjacent subcarrier;

if the power of the subcarrier i is less than the power of the adjacent subcarrier, adjusting the powers of the subcarriers on the super channel to a preset initial power, wherein the adjacent subcarrier comprises at least one of the subcarrier i−1 or the subcarrier i+1; and if the power of the subcarrier i is not less than the power of the adjacent subcarrier, performing the step of adjusting powers of the subcarriers on the super channel to the same power.

* * * * *